US007085693B2

(12) United States Patent
Zimmerman

(10) Patent No.: US 7,085,693 B2
(45) Date of Patent: Aug. 1, 2006

(54) MANIPULATION OF ELECTRONIC MEDIA USING OFF-LINE MEDIA

(75) Inventor: Thomas Guthrie Zimmerman, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 865 days.

(21) Appl. No.: 09/883,376

(22) Filed: Jun. 19, 2001

(65) Prior Publication Data

US 2002/0193975 A1 Dec. 19, 2002

(51) Int. Cl.
*G06G 7/34* (2006.01)
*H04M 1/30* (2006.01)
*H04M 1/50* (2006.01)
*H04M 1/54* (2006.01)
*H04M 1/65* (2006.01)

(52) U.S. Cl. .................. 703/6; 455/556.1; 434/362; 434/317; 345/179; 345/181

(58) Field of Classification Search ............ 703/6; 455/556.1; 345/179, 181; 434/262, 317
See application file for complete search history.

(56) References Cited

U.S. PATENT DOCUMENTS

| | | | | |
|---|---|---|---|---|
| 5,420,943 A | * | 5/1995 | Mak ........................ 382/313 |
| 5,454,046 A | * | 9/1995 | Carman, II ................ 382/186 |
| 5,546,337 A | * | 8/1996 | Hurt et al. ................. 365/121 |
| 5,553,312 A | * | 9/1996 | Gattey et al. .............. 455/11.1 |
| 5,565,658 A | | 10/1996 | Gerpheide et al. ............ 178/19 |
| 5,601,435 A | * | 2/1997 | Quy ....................... 434/307 R |
| 5,609,485 A | * | 3/1997 | Bergman et al. ............ 434/262 |
| 5,652,412 A | | 7/1997 | Lazzouni et al. ............. 178/18 |
| 5,686,705 A | | 11/1997 | Conroy et al. ............... 178/19 |
| 5,749,735 A | * | 5/1998 | Redford et al. ......... 434/307 R |
| 5,766,016 A | * | 6/1998 | Sinclair et al. ............. 434/262 |
| 5,800,178 A | * | 9/1998 | Gillio ....................... 434/262 |
| 5,825,009 A | * | 10/1998 | Schmid et al. .......... 235/462.01 |
| 5,839,905 A | * | 11/1998 | Redford et al. .......... 434/307 R |
| 5,854,945 A | * | 12/1998 | Criscito et al. ............... 710/62 |
| 5,909,211 A | * | 6/1999 | Combs et al. .............. 345/172 |
| 5,945,980 A | | 8/1999 | Moissev et al. ............. 345/173 |
| 5,953,457 A | | 9/1999 | Tucker et al. ............... 382/233 |

(Continued)

OTHER PUBLICATIONS

"The Tools of Progress" www.anoto.com Jun. 19, 2001 p. 1-15.*

(Continued)

*Primary Examiner*—Paul L. Rodriguez
*Assistant Examiner*—Tom Stevens
(74) *Attorney, Agent, or Firm*—Lacasse & Associates, LLC; Randy W. Lacasse; Ramraj Soundararajan

(57) ABSTRACT

The system generally comprises a probe device, a computing device, an electronic media, a presentation device, and a suitable medium as a specimen. The probe is manipulated over the specimen and information from the probe is transmitted to the computing device. The computing device uses the probe information to identify the image and probe position on the specimen. Based upon the specimen and position of the probe on the specimen, electronic media is presented simulating an output of a real tool used to inspect an actual specimen. The hand manipulation of the probe coordinated with the display of the electronic media provides the visceral experience normally encountered by a user of the real tool. In one embodiment, the probe is a camera and the specimen an image identified by examination of an image feature database. In an alternative embodiment, the probe is a finger.

31 Claims, 12 Drawing Sheets

U.S. PATENT DOCUMENTS

| | | | |
|---|---|---|---|
| 6,009,198 A | 12/1999 | Syeda-Mahmood | 382/215 |
| 6,076,166 A * | 6/2000 | Moshfeghi et al. | 713/201 |
| 6,108,640 A * | 8/2000 | Slotznick | 705/26 |
| 6,178,417 B1 | 1/2001 | Syeda-Mahmood | 707/3 |
| 6,180,444 B1 | 1/2001 | Gates et al. | 382/186 |
| 6,216,098 B1 * | 4/2001 | Clancey et al. | 703/6 |
| 6,281,888 B1 | 8/2001 | Hoffman et al. | 345/179 |
| 6,285,916 B1 * | 9/2001 | Kadaba et al. | 700/222 |
| 6,349,304 B1 * | 2/2002 | Boldt et al. | 707/102 |
| 6,427,079 B1 * | 7/2002 | Schneider et al. | 600/424 |
| 6,434,403 B1 * | 8/2002 | Ausems et al. | 455/556.2 |
| 6,446,127 B1 * | 9/2002 | Schuster et al. | 709/227 |
| 6,469,706 B1 | 10/2002 | Syeda-Mahmood | 345/589 |
| 6,504,571 B1 * | 1/2003 | Narayanaswami et al. | 348/231.99 |
| 6,512,525 B1 * | 1/2003 | Capps et al. | 345/762 |
| 6,515,988 B1 * | 2/2003 | Eldridge et al. | 370/389 |
| 6,594,383 B1 | 7/2003 | Syeda-Mahmood | 382/162 |
| 6,599,147 B1 * | 7/2003 | Mills et al. | 439/377 |
| 6,650,320 B1 | 11/2003 | Zimmerman | 345/179 |
| 6,691,126 B1 | 2/2004 | Syeda-Mahmood | 707/102 |
| 6,704,694 B1 * | 3/2004 | Basdogan et al. | 703/4 |
| 6,750,978 B1 * | 6/2004 | Marggraff et al. | 358/1.12 |
| 6,757,686 B1 | 6/2004 | Syeda-Mahmood et al. | 707/100 |
| 6,790,178 B1 * | 9/2004 | Mault et al. | 600/300 |

OTHER PUBLICATIONS

Zimmerman T.G. "Wireless Network Digital Devices: A New Paradigm for Computing and Communication" IBM Systems Journal 1999 vol. 38 Issue4, p. 566-569.*

"The Tools of Progress", <http://www.anoto.com/print_page.asp?cid=>> p. 1-15, Jun. 19, 2001.

Lisa Stifelman, "Augmenting Real-World Objects: A Paper-Based Audio Notebook," *Proceedings of CHI'96*, Apr. 13-18, 1996, Vancouver, Canada, 2pgs.

Cordelia Schmid et al., "Local Greyvalue Invariants for Image Retrieval," *IEEE Trans. on Pattern Analysis and Machine Intelligence*, V19, N5, May 1997, pp. 530-535.

* cited by examiner

MANIPULATION OF ELECTRONIC MEDIA USING OFF-LINE MEDIA

BACKGROUND OF THE INVENTION

1. Field of Invention

The present invention relates generally to manipulation of electronic media using off-line media. More specifically, the present invention is related to synchronizing the actions of a user manipulating off-line media to responses in electronic media.

2. Discussion of Related Art

Children and students benefit from having a variety of tools (or instruments) to study the world including microscopes, telescopes, etc. These tools allow the individuals to explore the world through direct manipulation and observation. Often, rather than having availability of such tools, the children or students learn about the information these tools provide through static images presented to them in books or displayed on a computer screen. There is a context and visceral experience of moving a tool that is lost when the images from these tools are presented in such a static manner. Some tools, no matter what the availability, are beyond the means of children and students to use because of factors like size, cost, complexity and safety. Examples include atomic force microscopes, mass spectrometers, magnetic resonance imagers, Geiger counters and electrophoretic devices.

Simulation machines have often been used in some fields to provide the same visceral experience to a user in similar situations, i.e., when the expense is high or availability of equipment is low. For instance, flight simulators have often been used to train pilots without actually having to provide a plane. In addition, medical operations and diagnosis have been simulated in order to give students or professionals experience, without actually having to practice on a patient. Normally, simulators are used to give true to life experience, without the expense associated with a true experience. Most simulators themselves are expensive pieces of equipment and not widely available. The following provide some examples of simulation systems.

The U.S. Pat. No. 5,609,485 to Bergman et al. describes a medical reproduction system, which is designed to train medical physicians and technicians in the use of ultrasound equipment. Biological data is collected from a living human and stored in memory. A user then manipulates a transmitter over a simulated body. The transmitter sends position data to a receiver and, based upon the position, corresponding, preset biological data is displayed.

The U.S. Pat. No. 5,766,016 to Sinclair et al. describes a surgical simulator, which provides visual and tactile feedback to portray an actual surgical procedure. Feedback is generated by an SGI computer to display two images at slightly different perspectives, which are combined to form a stereoscopic image. Force feedback motors are provided to generate resistive force to an instrument utilized to simulate a surgical tool.

The U.S. Pat. No. 5,800,178 to Gillio describes a virtual surgery system, which includes a box having entrances thereon. Simulated tools are inserted through the entrances and image data of a patient is utilized to provide the virtual surgery. Force feedback is provided with the images to provide resistive forces to the simulated tools.

The above examples are expensive systems, and due to the specialty of their purpose are not available to everyone generally. These devices do not provide people in general with a manner to explore aspects of the world normally unavailable to them in a manner that is the most productive, i.e., with a visceral experience.

There have also been efforts to provide people with a more interactive experience with static printed materials, such as books. The U.S. Pat. Nos. 5,749,735 and 5,839,905 to Redford et al. describe an interactive system in which a printed publication has a button or buttons associated therewith. When a user activates the buttons, it remotely controls a display to display content associated with the button. This system does not truly provide a visceral experience as there is no direct manipulation of a hand-held device, merely the pressing of a button, which calls up associated content.

Also, people often prefer reading and manipulating off-line media (e.g. paper, magazines, newspapers and books) than electronic media (computers displaying on CRT, mobile phone and personal digital assistants displaying on small LCD screens). Off-line media typically has better resolution, contrast and viewing area, is lighter weight, less expensive, and portable than digital media. For example when writing a large paper, people tend to print out a copy and edit with pencil, then enter the changes into their computer. Many people read books and underline important passages, words or references. Cross word puzzles appear in newspapers and magazines are filled out with pencil or pen. Bookmarks or paper clips are placed in books to mark pages. Magazines featuring full picture advertisements and mail-order catalogs provide a better user experience than electronic catalogs due to their ease-of-use and high quality presentation. People cut out or circle articles and pictures from magazines and newspapers with ease. However, digital electronic media offers better searching, indexing, manipulation, distribution, and communication than off-line media can provide. For example calling in an order by phone is a slow process and requires a human operator. Filling out a form and mailing it is even a slower process. Yet finding the correct URL for a web page can be difficult, as URLs are not necessarily the exact company name, and further, a company may have hundreds or thousands of pages, making finding a particular page difficult.

Therefore, it is desired to provide a means for people to manipulate familiar and comfortable off-line media, and simultaneously effect electronic media to take advantage of the searching, indexing, referencing, and manipulation capabilities of digital electronic media.

There have been efforts to allow customers to scan bar codes printed on off-line material, and use the bar code to provide digital links to products. The CueCat ® from Digital Convergence is a bar code reader and software. When the bar code reader is swiped across a product with a UPC (Universal Product Code), the product's web page appears on the computer.

Anoto Corporation provides a pen that reads tiny dot codes printed in newspaper advertisements. When a user sees an ad for flowers and fills out the form, the pen wirelessly transmits the handwriting and user id to the user's mobile phone, and their order is placed electronically.

However, both these systems of bar codes and dot codes require specially prepared off-line media and do not allow manipulation of the electronic media. Advertisers are reluctant to add special bar codes or dot codes to their advertisements in newspapers and magazines without a proven benefit. Yet it is difficult to prove a benefit with prior art if the special bar or dot codes are not inserted in the advertisements. It would be advantageous to provide a means to allow synchronization of electronic media with unmodified off-line media. For example, a company could provide synchronization to magazines and newspapers without modifying the images and text printed in the magazines and newspapers.

The U.S. Pat. No. 5,420,943 to Mak describes an input device in which a CCD device is utilized to scan an off-screen medium in order to effect input. One embodiment of Mak utilizes unique positions on the off-screen medium, which are utilized to input ASCII characters or commands. However, Mak does not synchronize the unique position with corresponding multimedia data to be displayed by the computing device.

The U.S. Pat. No. 5,601,435 describes a system in which physiological monitors attached to an individual are used as inputs to specialized software which leads the user through a medical diagnosis and further provides advice about whether to see a caregiver, diet, health habits, etc.

The U.S. Pat. No. 5,825,009 to Schmid et al. and U.S. Pat. No. 5,854,945 to Criscito et al. describe systems for inputting bar code data through a keyboard port or buffer of a computer.

Whatever the precise merits, features and advantages of the above cited references, none of them achieve or fulfills the purposes of the present invention.

SUMMARY OF THE INVENTION

In view of the foregoing and other problems, disadvantages, and drawbacks of the conventional methods and structures, an object of the present invention is to provide a means of causing the manipulation of electronic media by the manipulation of off-line media. The present invention presents a system and method of causing the manipulation of electronic media by the manipulation of a probe by a user over off-line media.

The system generally comprises a probe device and a computer. The probe is manipulated over off-line media, preferably printed medium, and information is transmitted to the computer and matched to electronic media. Based upon the position of the probe over the off-line media, corresponding multimedia data is retrieved from storage and presented to the user. Preferably, the multimedia data and off-line media are designed so as to provide an educational experience in which the synchronization of the probe position and output provides the visceral experience normally experienced by a user of a real tool. To simulate the real tool, the multimedia data corresponds to the output a real tool would produce when the real tool is used to inspect the items on the off-line media.

Alternatively, the multimedia data and off-line media is designed so as to provide a commerce experience in which the synchronization of the off-line media and electronic material enhances the knowledge of the user to the products in the off-line media, for example, showing different views or colors of a dress, or a simulation of the user in the dress. By touching the probe on a photo of the dress in the off-line magazine, dress information from the retailer or manufacturer can be downloaded to the user, for example, by the Internet, or on a compact disk (CD) provided with the magazine. A network connection would allow ordering of catalog products.

In a preferred embodiment, the off-line media is not modified in any special way to enable synchronization with electronic media. The probe includes a camera to capture image segments and transmits them to a computing device, either local or remote, communicating through wired or wireless means. The computing device analyses the image segments, determines the image identity, and retrieves and presents electronic media corresponding to the image to the user. Probe position may also be detected by the computing device and used in the presentation to enhance the control and user experience.

In another embodiment, the printed medium additionally has a number of icons representing different tools to be simulated. By placing the probe over a particular icon, the tool represented by the icon is selected such that the retrieved multimedia data corresponds to the selected tool. In another embodiment, icons or menus representing different tools to be simulated are presented on the computer screen.

In another embodiment of the invention, the off-line media is a book including text and the probe is a finger with associated electronics to measure the position of the finger on the book. When the finger touches a word in the book, the synchronization means produces audio output reciting word definition and pronunciation.

Off-line media can be any non-networked media or object including books, magazines, newspapers, posters, pictures, mosaics, tapestry, two and three dimensional objects, animals, people, furniture, toys, cups, plates, silverware, business cards, and clothing. Electronic media can be any computing, communicating, or display device including mobile phone, personal computer, personal digital assistant, watch, television, and head mounted display.

Manipulation of the probe can include gestures, translation, rotation, scanning, pressing, clicking, throwing, tapping, waving, or commanding, for example by voice command. Alternately, the probe can be stationary and the off-line media manipulated, such as placing a magazine near a stationary digital camera connected to a computer, or placing a book on a digital scanner.

The probe can be any device that enables a computing device in communication with the probe, either local or remote, wired or wireless, to identify and synchronize the off-line media to electronic media. As will be shown, the probe can be electronic, for example a camera, scanner, ultrasonic, or magnetic-based digitizer, or non-electronic, for example a human finger, pen or pencil.

DESCRIPTION OF THE PREFERRED EMBODIMENTS

Figure 1:
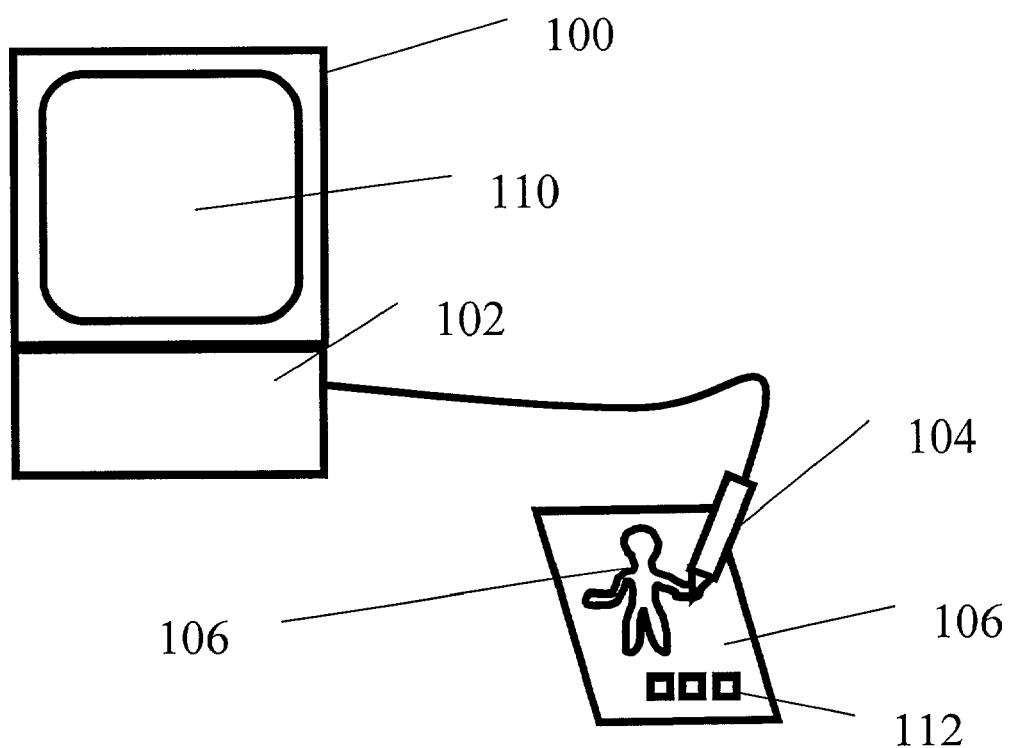
FIG. 1 illustrates the system for controlling visual representations on an electronic display according to a probe's position on an off-line media.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications of the materials for its construction and is not intended to limit the invention to the embodiment illustrated. Those skilled in the art will envision many other possible variations within the scope of the present invention.

FIG. 1 generally illustrates the system of the present invention. The system comprises a general-purpose computer 100 having a storage device 102, such as CD-ROM storage, and a probe device 104 attached thereto. Probe device 104 is attached to computer 100 via any suitable I/O interface so as to allow the probe to input data to computer 100. The I/O interface can including wired (e.g. USB, serial, parallel, firewire, optical communication) or wireless (e.g. 802.11, Bluetooth, UHF, infrared, CDMA, G3, PCS, mobile phone, ISM band RF) means. CD-ROM storage 102 stores electronic media (e.g. image and sound data), pointers to electronic data (e.g. URLs), and application code, which is retrievable, executable, and displayable by general-purpose computer 100 on display 110. Any alternative storage media would be appropriate for the practice of the present invention. For instance, any other optical format, magnetic, or solid-state memory are appropriate. In addition to general-purpose computer 100 and probe 104, a printed medium 106 is also provided. Printed, off-line medium 106 has a suitable image 108 imprinted thereon. When a user manipulates probe 104 over medium 106, information detected by the probe 104 is transmitted by probe 104 to general-purpose computer 100. The general-purpose computer 100 converts the information detected by the probe 104 into image identification and probe 104 position information. Electronic media (e.g. multimedia content including pictures, illustrations, movies, and sound) corresponding to image identification and probe 104 position is retrieved from CD-ROM storage device 102 and presented to the user.

Embodiments of Probe

There are many possible constructions for probes, some embodiments are described below.

Bar Code Reader

Figure 2A:
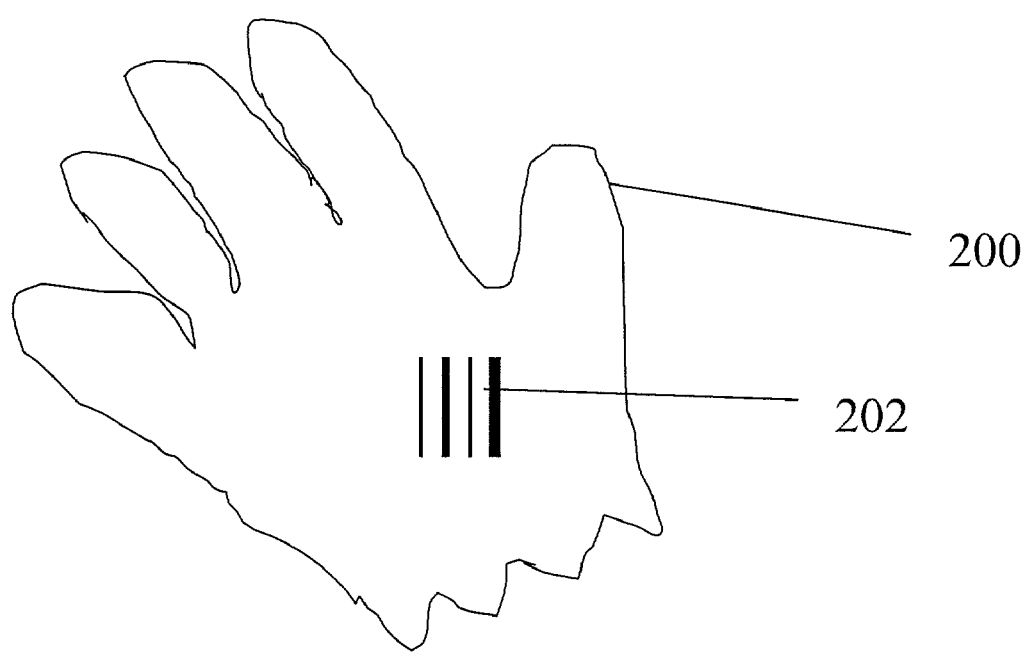
FIG. 2a illustrates a close up of a location of the off-line media for the bar code positioning embodiment of the present invention.
Figure 2B:
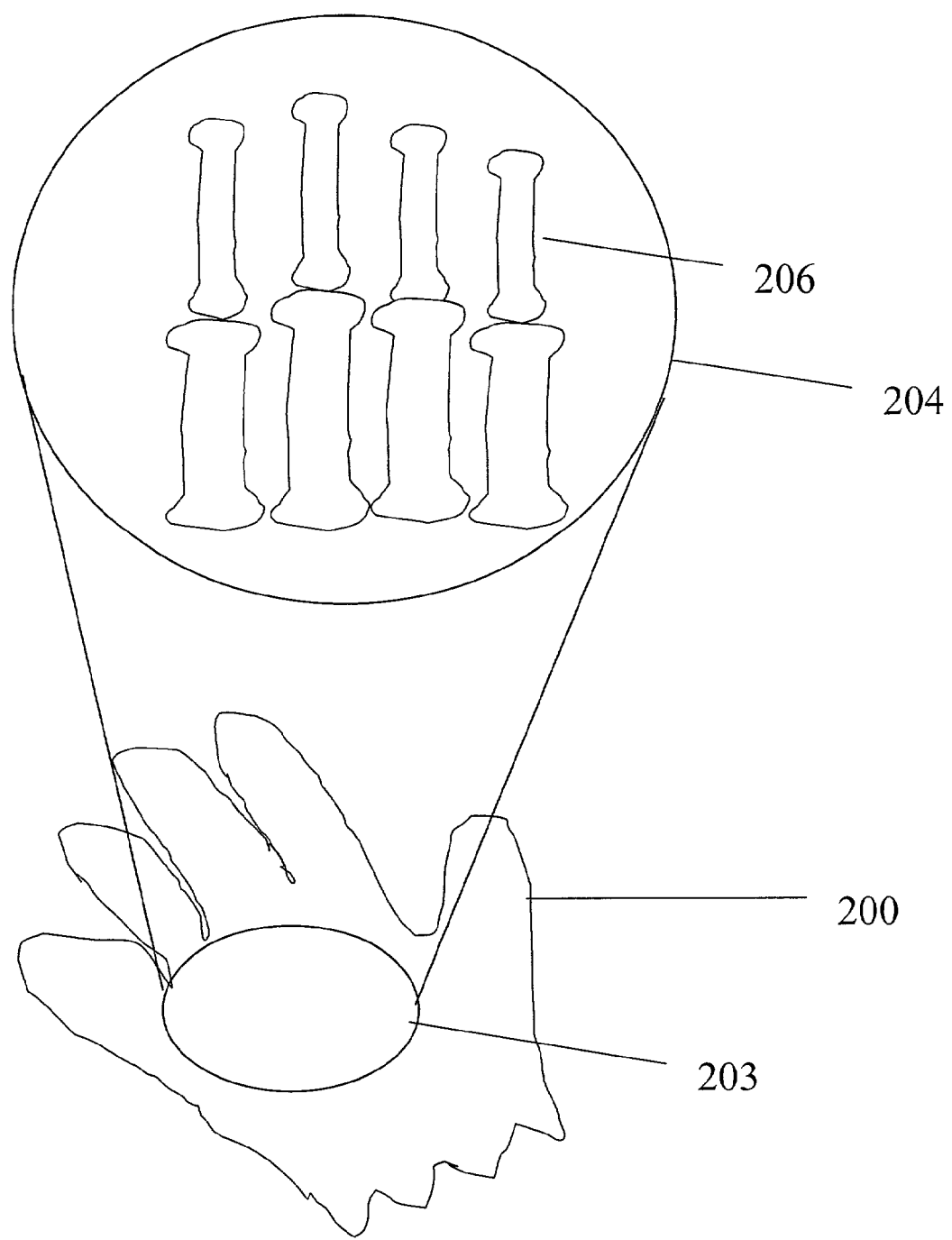
FIG. 2b illustrates the use of the present invention with the location of FIG. 2a while simulating an x-ray machine.
Figure 2C:
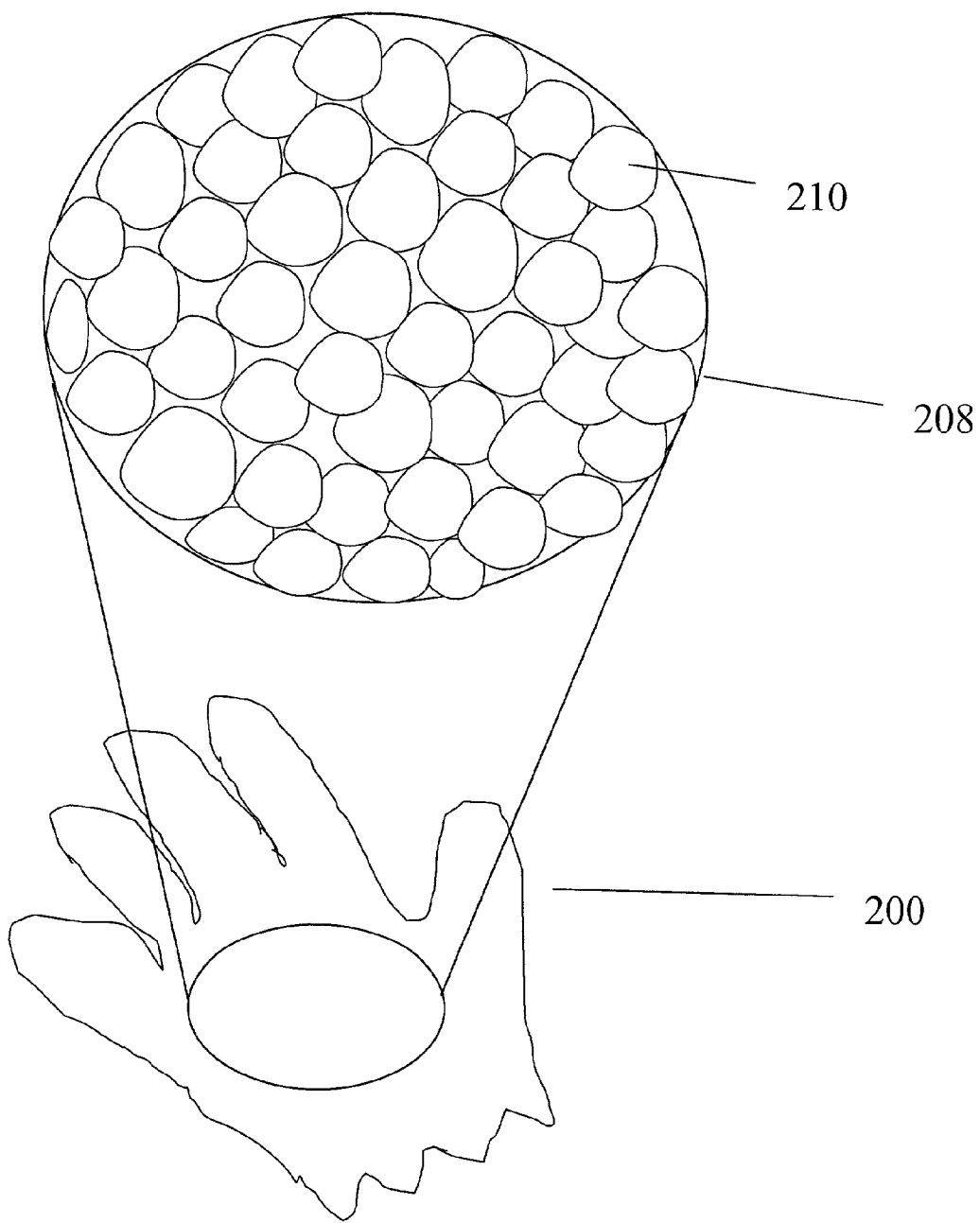
FIG. 2c illustrates the use of the present invention with the location of FIG. 2b while simulating a microscope.

FIG. 2a-2c illustrates the invention using a book as the off-line media, turned to a page that shows the human hand. FIG. 2a illustrates the use of the present invention with position and image identification information encoded in bar codes printed on the off-line media, preferably with invisible ink, as taught in U.S. Pat. No. 5,652,412 entitled, "Pen and paper information recording system," incorporated herein by reference.

In another embodiment, the bar codes 202 are printed on clear plastic (e.g. mylar) sheets and adhered to the pages of the off-line media. This allows a book to be published using conventional printing techniques, and bar codes to be placed on the pages after conventional printing.

Bar codes 202 embedded in the image provide position and image identification data to the computer. FIG. 2b illustrates use of the present invention simulating an x-ray machine. The probe 104 is placed over the picture of the hand 200 in book. The probe 104 sends bar code information to the computer. The computer decodes the bar code information into probe position and image identification, resulting in a synchronized image 204 on the computer screen of human bones 206.

FIG. 2c illustrates the use of the present invention simulating a microscope under sufficient resolution to see skin tissue cells 210, presented on the computer screen 208, spatially synchronized to probe 104 position over the picture of the hand 200.

Magnetic Digitizer

In an alternative embodiment, the absolute position of the probe is transmitted to the computer. In this manner, continuous motion of a computer generated image is provided as the probe is swept over the printed medium. In one aspect of this embodiment, the probe device comprises a digitizer which uses magnetic fields to determine the position of the probe, such as Wacom graphic tablet digitizers.

Passive Probe

In another embodiment of the invention, the probe is a human finger, and the finger position is measured by coupling an electric field into the finger and measuring the coupling to receiving electrodes located below the off-line media as taught in U.S. patent application Ser. No. 09/226, 788 filed Jan. 7, 1999, now U.S. Pat. No. 6,281,888, entitled, "Pen Input Device using Electrostatic Coupling," incorporated herein by reference.

Other methods of measuring the position of a finger through an insulator (such as pages of a book or catalog) are taught in U.S. Pat. No. 5,945,980 and U.S. Pat. No. 5,565, 658, both of which are incorporated herein by reference.

By using the finger as the probe, the user can touch objects on the page and have them displayed on the screen. If the objects are words, the computer could speak the words using text-to-speech synthesis.

In another aspect of the invention, the probe is a passive conducting object, such as a metal rod, pen (the ink is conductive due to ionic salts used in the ink), pencil (the graphite core is conductive, since graphite is carbon), or conductive plastic.

Active Electrostatic Probe

In another embodiment, the probe position is determined by measuring electrical potentials across a conductive sheet located underneath the off-line media, as taught by Conroy et. al. in U.S. Pat. No. 5,686,705, incorporated herein by reference.

Ultrasonics

In an alternative embodiment, the absolute position of the probe is encoded and transmitting to computer 100. Computer 100 then displays a continuous motion of the image as probe 104 is swept over an area of the page, i.e., as probe 104 sweeps image 108 on medium 106, the image displayed by computer 100 is swept also. This provides the advantage of strengthening the realism of the probe becoming a tool. As previously described, one method of determining and transmitting the absolute position of probe 104 over media 106 is by using a Wacom tablet. A preferable method utilizes a tablet which uses ultrasonics to determine probe position. This implementation provides the additional advantage of allowing the probe's use with normally printed pages.

Figure 3:
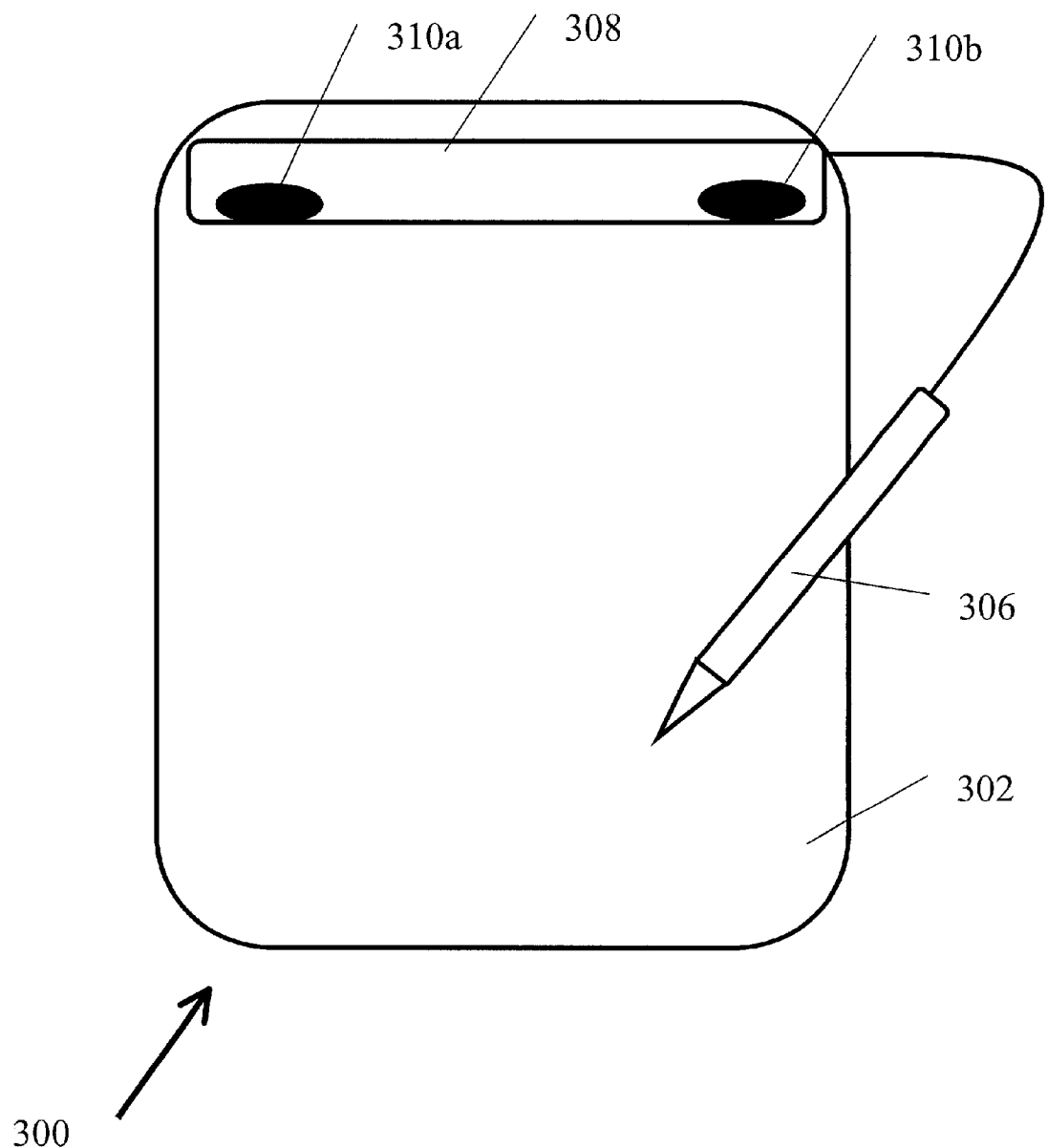
FIG. 3 illustrates a device, which provides probe position data to a computer for use with the absolute positioning embodiment of the present invention

FIG. 3 illustrates a tablet utilizing an ultrasonic method for position determination. A tablet 300 comprises a board 302, preferably made of plastic, with a clip header 308, which includes electronics to perform the appropriate processing to determine position. A probe 306 has an ultrasonic transmitter embedded therein and is connected to tablet 300 via a two-conductor wire so as to be supplied with power from a battery located in clip header 308. Attached to clip header are two ultrasonic receivers 310a and 310b. When medium 106 is clipped to board 302 by clip header 308 and probe 306 is moved across medium 106, the ultrasonic transmitter outputs ultrasonic pulses. Receivers 310a and 310b receive these ultrasonic pulses. Because the ultrasonic pulses travel at a finite speed and receivers 310a and 310b are placed in a spaced relation, the position of the probe can be calculated based upon the arrival times of the ultrasonic pulses at the receivers. This information is then transmitted to computer 100. As the position of the probe is related to the region of the image the probe is pointing to, the corresponding images for the region are displayed on the display 110. In this embodiment, the combination of tablet 300 and associated electronics and probe 306 in essence act as the probe device in the sense that they transmit the position information to computer 100.

Preferred Embodiments of Probe

Figure 4:
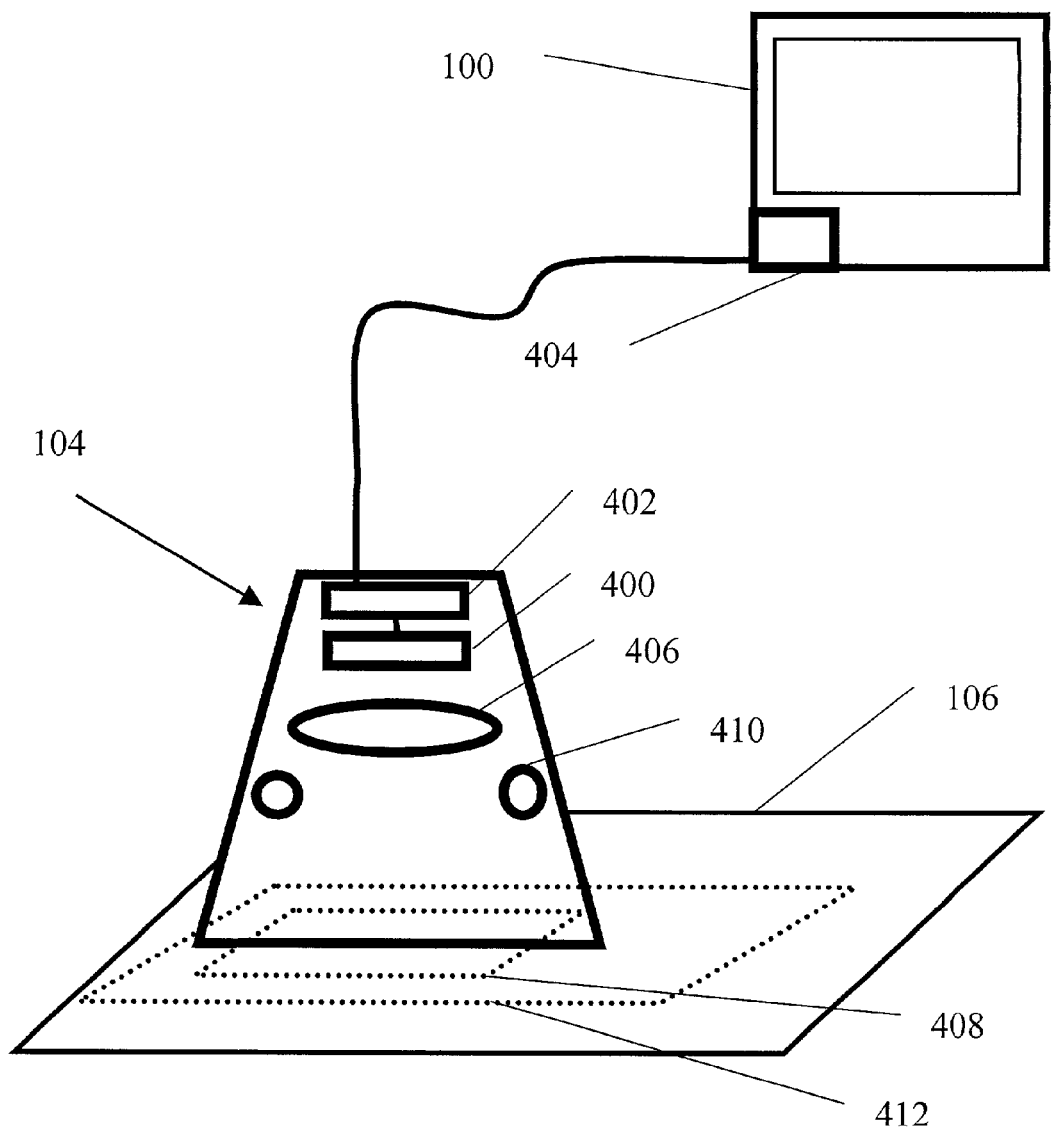
FIG. 4 illustrates a probe including a camera provide images segments to a computer for determining the image identity, position of the probe on the image.

Referring to FIG. 4, in a preferred embodiment of the present invention, probe 104 contains a CMOS monochromatic camera 400 with wide angle lens 406 and illumination system 410 to capture an image segment 408 printed on the medium 106, underneath the probe. The image is detected and transmitted to the computer 100 by image processor 402, communicating to the computer 100 through connector 404, such as Universal Serial Bus (USB). The image segment 408 is a portion of a full image 412 appearing in the off-line media 106. An image retrieval method running in the computer 100 receives the image segment 408, and outputs image identification and position information of the image segment 408. A presentation method running in the computer 100 receives the image segment 408 information and presents multimedia content contained in a CD-ROM storage device 102 based on the virtual tool or function selected by the user.

In the preferred method of the present invention, a camera in the probe takes an image of the off-line media, referred to as a sampled image. The sampled image is matched to a reference image known to the computer. Further the computer determines the relative position of the sampled image to the reference image. Since the image contained in the off-line media may be larger than the capture area of the camera, the sampled image may be a subsection of the reference image, known as a cropped or partially visible image.

Figure 5:
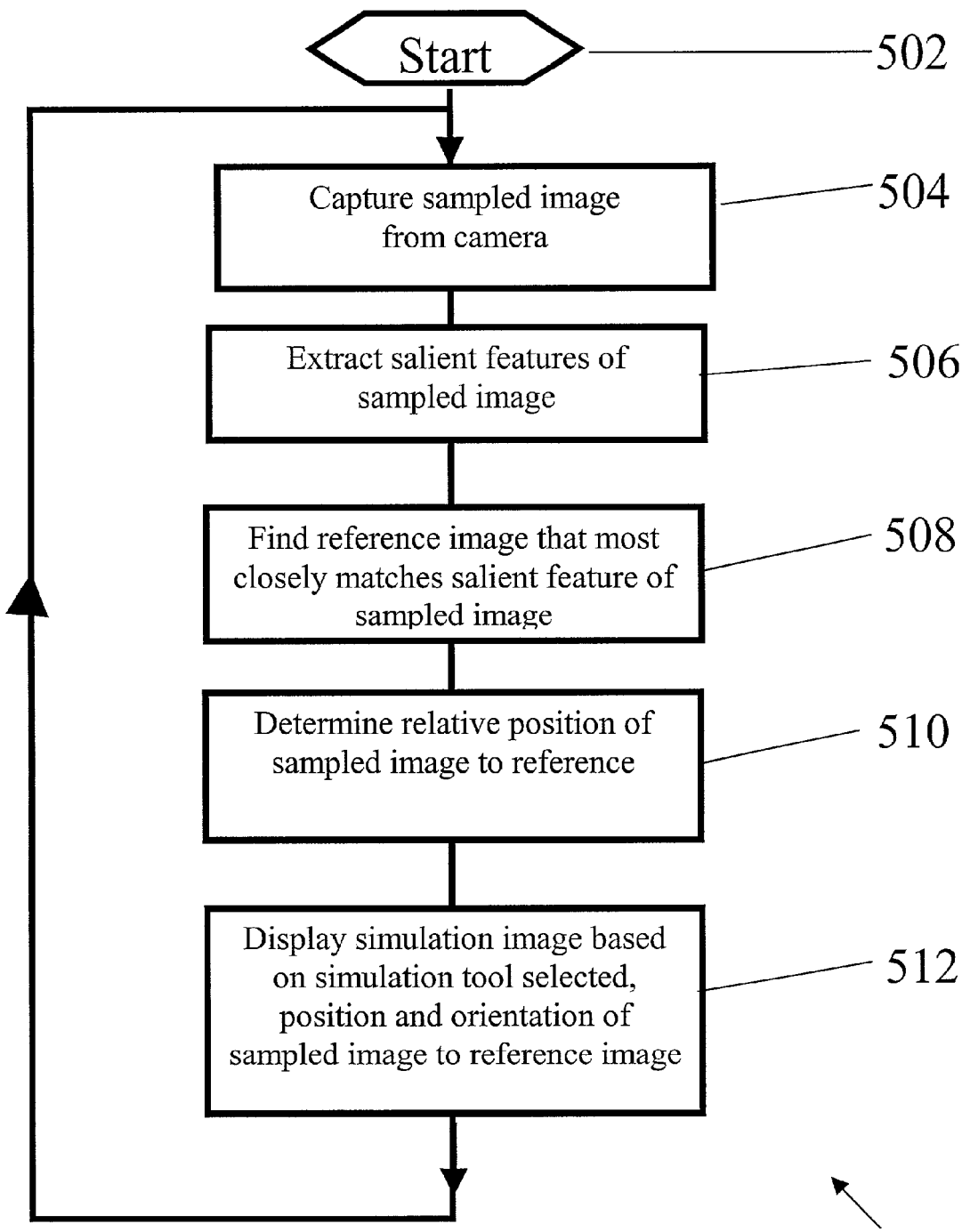
FIG. 5 illustrates a method to determine image identity and position using a camera probe.

FIG. 5 shows a flow chart summarizing the methods of sampled image to reference image matching and presentation required to control electronic media using off-line media. The control program starts at block 500. At block 504 the sampled image is captured by the camera 400 in the probe 104. At block 506 the salient features of the sampled image are extracted. At block 508 the salient features of the sampled image are used to find the closest reference image.

At block 510 the position of the sampled image is determined. A preferred method of position detection is to perform cross-correlation between sampled image and reference image. The highest correlation will occur when the sampled image is placed in the relative position of the probe 104 during sampling. A preferred method of cross-correlation is taught by Zimmerman, et. al. in U.S. patent application Ser. No. 09/640,133, now U.S. Pat. No. 6,650,320, entitled, "Digital Pen Using Visible Image and Autocorrelation of Substrate Pattern," incorporated herein by reference.

At block 512 the presentation method generates multimedia based on the reference image and relative position of the probe 104 and tool selected by the user. The orientation (rotation) of the probe 104 may also be used to effect the presentation.

A preferred method of matching salient features of the sampled image to the reference image is taught by Cordelia Schmid and Roger Mohr in "Local Greyvalue Invariants for Image Retrieval" (IEEE Trans. On Pattern Analysis And Machine Intelligence Vol 19, No. 5, May 1997, pp. 530–535), incorporated herein by reference. Their method detects local features in the image using gray value invariants, allowing detection of partial images using a monochromatic camera. The authors report the following results using a database of 1020 images. When the sampled image is 30% the reference image recognition rate is 100%. When the sampled image is 20% of the reference image, recognition is 95%. When the sampled image that is 10% of the reference image, recognition is 90%. Their method is also insensitive to zooming by a factor of 2, and completely invariant (insensitive) to rotation.

The present invention takes repeated sequential sampled images. When three sequential sampled images are identified as belonging to the same reference image, a match is declared, increasing the probability of a correct match.

Alternate methods of matching sampled images to reference images are taught in U.S. application Ser. No. 09/593,131, now U.S. Pat. No. 6,757,686, entitled, "Method and Apparatus for Representing Database and Query Information Using Interval Hash Tree", and U.S. Pat. No. 6,009,198, entitled "Method for matching perceptual shape similarity layouts across multiple 2D objects", both of which are incorporated herein by reference.

In another embodiment a color camera is used in the probe 104. A method of searching and matching color sample images to color reference images are taught in U.S. application Ser. No. 09/593,465, now U.S. Pat. No. 6,691,126, entitled, "Method and apparatus for locating multi-colored objects in an image or video database", U.S. application Ser. No. 09/441,050, now U.S. Pat. No. 6,594,383, entitled, "Method and apparatus for indexing and retrieving images from an image database based on a color query", and U.S. application Ser. No. 09/440,852, now U.S. Pat. No. 6,469,706, entitled, "Method and apparatus for detecting regions belonging to a specified color surface in an unsegmented image", all of which are incorporated herein by reference.

Embodiment Using Image to Synchronize to Audio

Figure 6:
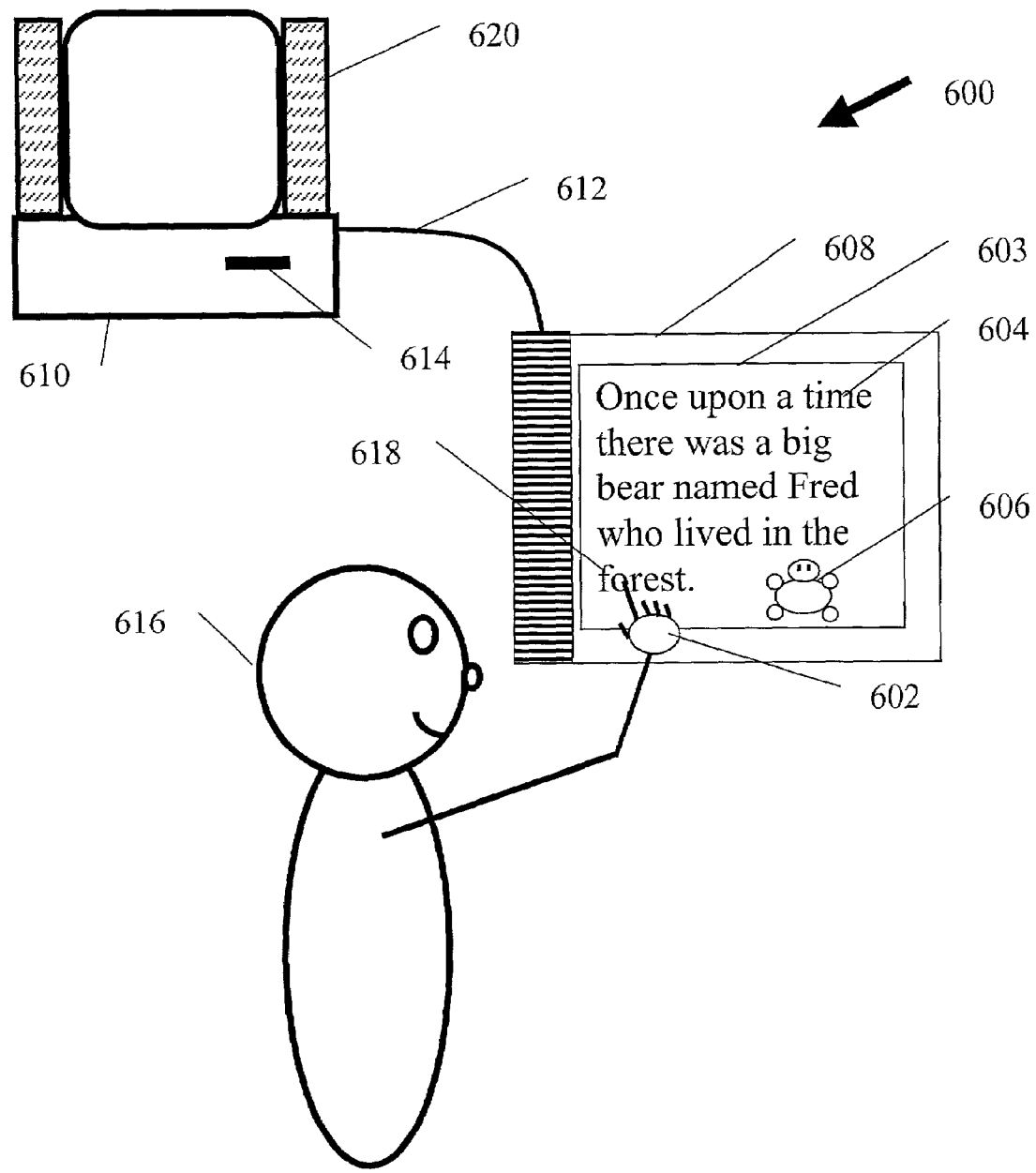
FIG. 6 illustrates a user pointing to words contained in a book located on top of an electrostatic digitizer.

FIG. 6 illustrates an embodiment of the invention 600 using the finger 602 as the probe to synchronize an electronic audio presentation to off-line media. A book 603 containing text 604 and drawings 606 is placed on top of an electrostatic digitizer 608, as taught in U.S. application Ser. No. 09/640,133, now U.S. Pat. No. 6,650,320. The digitizer detects and reports the position of the finger 602 on or near the book (x, y, and z) to a multimedia computer 610 through a data communication link 612, such as USB (Universal Serial Bus). A compact disk storage 614 in the computer 610 contains electronic media particular to the book 603, including the identity and location of text and illustrations. The digitizer 608 determines page number by reading bar codes printed on the edge of the book 603 as taught by Lisa Stifelman in "Augmenting Real-World Objects: A Paper-Based Audio Notebook" Proceedings of CHI '96, Vancouver, Canada, incorporated herein by reference. Using this method of bar code scanning, the computer 610 is synchronized to the page of the book 603 the user 616 is viewing.

The manipulation of the users finger 602 over the off-line media is synchronized to electronic media. When the user 616 touches a particular word, for example "forest" 618 as show in FIG. 6, the computer 610 retrieving an audio clip of the spoken word "forest" from storage 614, and played it out speakers 620. When the user 616 touches the drawing 606, the sound of a bear growling occurs.

Applications of synchronizing off-line media to electronic audio include reading children's books, annotating action, describing items in a catalog, explaining how things work, and translating off-line text into other languages.

Embodiment Example

Science Lesson

Figure 7:
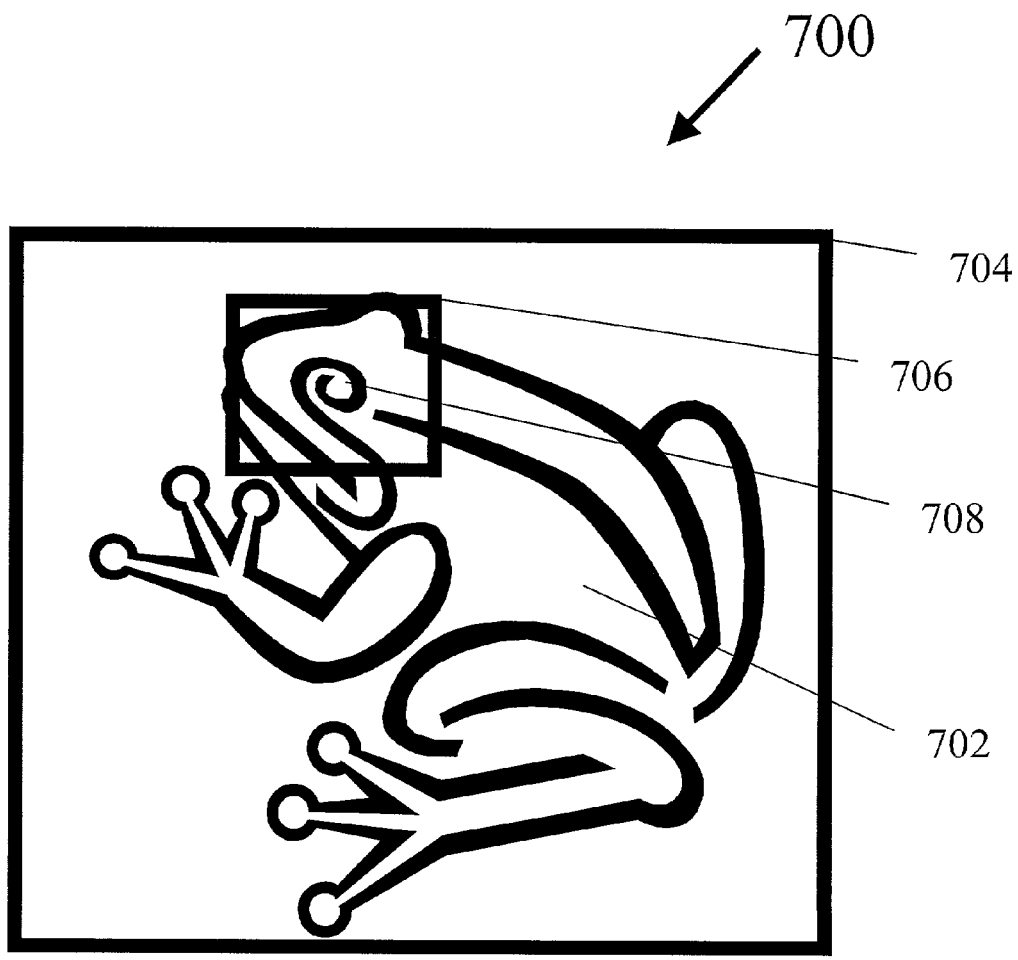
FIG. 7 illustrates an example of a book as off-line media, containing an image of a frog.

FIG. 7 illustrates an application of the invention to teach a science lesson on frog anatomy. The off-line media is a book 700 on reptiles, and the page 704 selected by the user shows an image of a frog 702. The user places the camera probe 104 over the frog's eye, creating a sampled image 706 about the frog's eye. FIGS. 8a–8d illustrate the presentation output for various tools selected by the user.

Figure 8A:
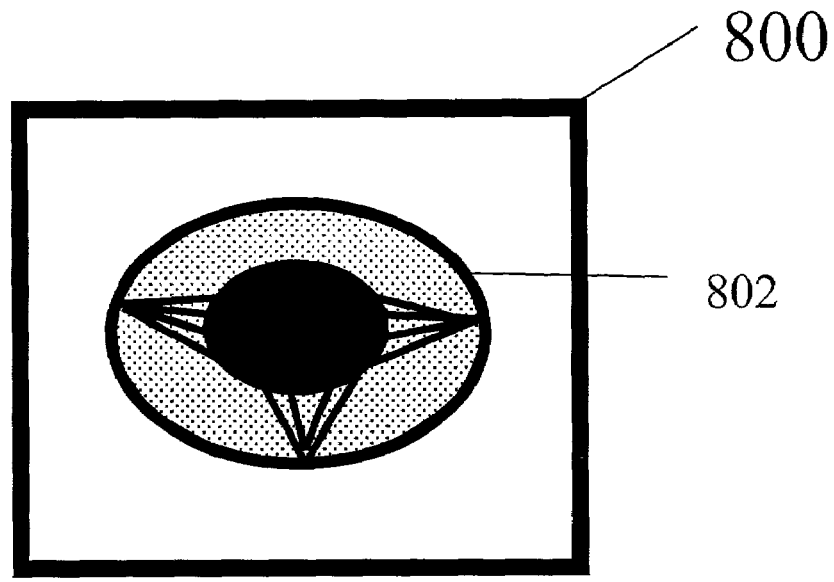
FIG. 8a illustrates the use of the present invention with the location of FIG. 7 while simulating an optical microscope.

FIG. 8a illustrates a microscope tool. The invention matches the sampled image 706 to a reference image of the frog's eye retrieved from storage device 102. Based on the probe 104 position, reference image, and tool selected, a magnified view of a frog eye 802 is presented on the computer screen 800. The invention synchronizes the movement of the probe 104 to the display of the frog's eye 802. When the user moves the tool to the right, the image of the frog's eye on the computer 800 screen would also move to the right, giving the user the visceral experience of holding an actual microscope over a frog's eye. Since the image is from the computer storage device 102 and not a magnified version of the visual image occurring on the off-line media 704, the presentation is not limited by print resolution, or reality. Instead the image presented from the storage device 102 can be from any source and resolution.

Figure 8B:
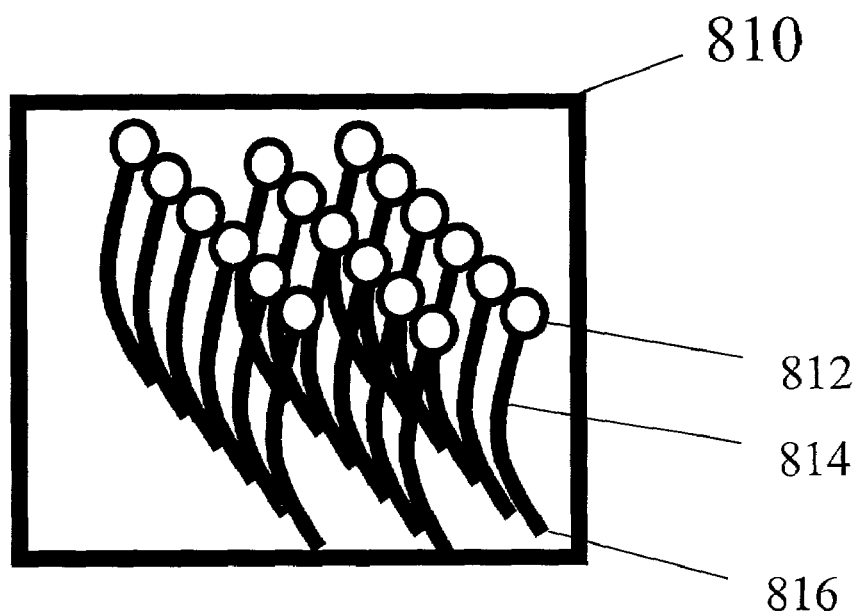
FIG. 8b illustrates the use of the present invention with the location of FIG. 7 while simulating an electron microscope.

As the user increases the virtual magnification of the probe 104, for example by turning a knob on the probe 104 (not shown), FIG. 8b appears on the computer screen 810, presenting an electron microscope image of the frog's retinal cells, showing the structure of the rod 812, fiber 814, and synaptic ending 816.

Since the simulated display on the computer screen is not bound by the static reality of off-line media, the synchronized presentation may include dynamic images. For example when viewing the eye, the user can press a button on the probe 104 (not shown) to generate a virtual bright light at the probe, causing the image of the frog's eye 802 to retract in the socket. The synchronization of off-line media with electronic media taught by the invention offers direct experience with phenomena, as if the user were shining an actual light on a live frog's eye.

Figure 8C:
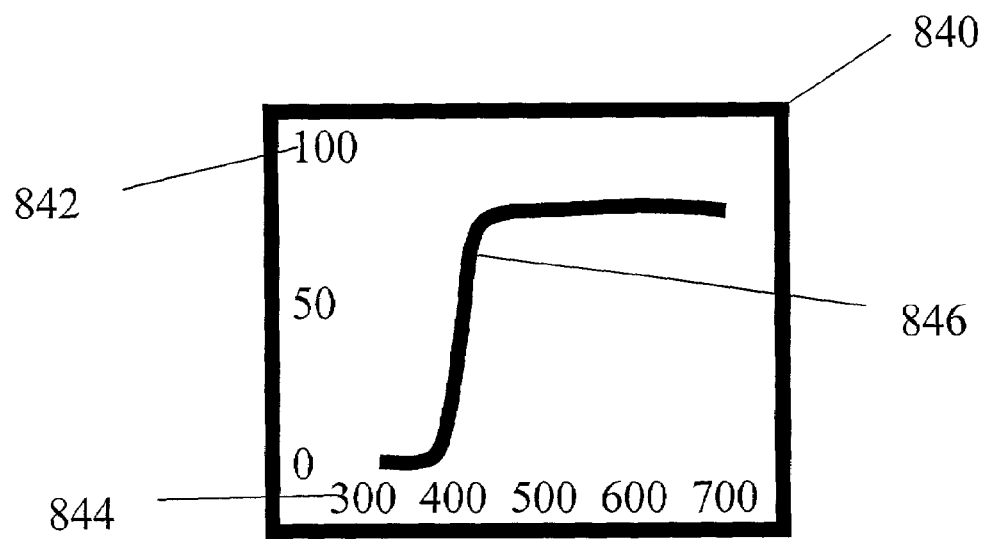
FIG. 8c illustrates the use of the present invention with the location of FIG. 7 while simulating a spectroscope.

FIG. 8c illustrates the probe 104 functioning as a spectrometer. The spectral response 846 of the frog's eye is displayed on the computer screen 840. The frog's amplitude of response 842 is plotted against wavelength 844. When the user moves the probe 104 onto the skin, the spectral response 840 of the skin is displayed, reinforcing the causal relationship between movement of the probe 104 on the off-line media and presentation of electronic media.

Figure 8D:
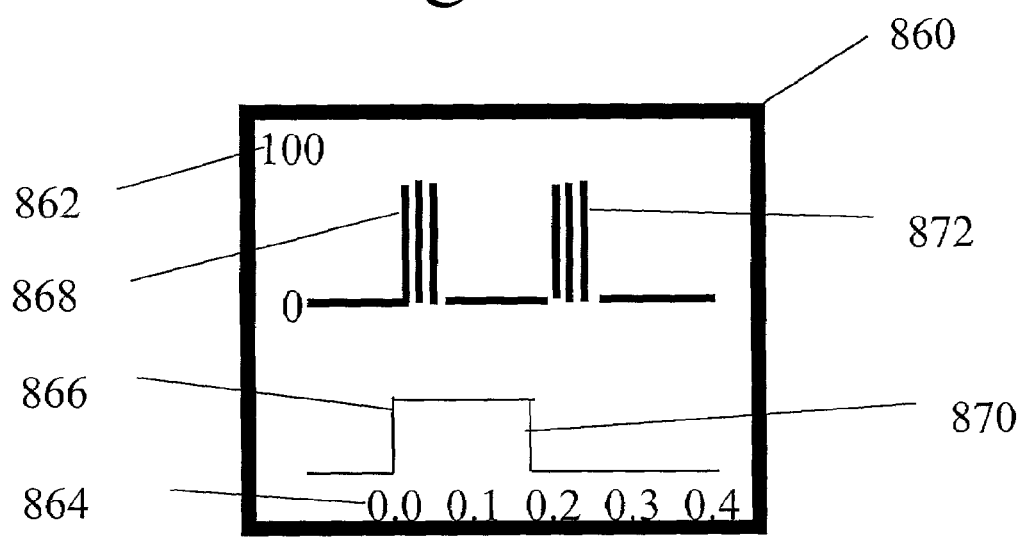
FIG. 8d illustrates the use of the present invention with the location of FIG. 7 while simulating a voltage probe.

FIG. 8d illustrates the probe 104 functioning as both stimulus and sensor. Pressing a button on the probe 104 (not shown) causes a virtual light to flash on the frog's eye. The time 864 and amplitude 866 of the light stimulus is displayed on the lower trace 870. The electrical response 862 of the frog's nerve cells is shown on the upper trace 872, demonstrating electrical firing of nerve cells in response to light stimulus.

Embodiment Using Off-Line Text Images to Manipulate Computer Text

The off-line media is not limited to images and can include text. In an application of the invention where the media 106 includes text, the user may circle text, or swipe the text with the probe 104 to select, translate, provide definition (e.g. from a dictionary), underline, highlight, make bold, copy or cut the corresponding electronic text appearing in the computer 100. In this application, images of the text, or salient features of the text need not be stored in the computer 100. In a preferred embodiment, text is stored as ASCII characters along with the font and other layout and contextual information to enable the computer to generate an accurate image of the page, or otherwise sufficiently represent the page. From this representation, the software can re-create the salient features of the text and match these salient features with image segments captured by the probe 104. Methods to match salient feature of text based on spatial layout is taught in U.S. Pat. No. 6,178,417 "Method and Means of Matching Documents Based On Text Genre," incorporated herein by reference.

The off-line material does not have to be printed text. The method of selecting, highlighting, copying, underlining, or otherwise manipulating images presented in media 106, may be applied to cursive or printed handwriting presented in media 106. In a preferred embodiment of a handwriting application, the probe 104 includes a CMOS camera to capture image segments and a database of the handwriting is queried to match handwriting segments to a database of handwriting. In a preferred embodiment, the database of handwriting is created by a digitizing pen, such as Anoto. Methods to match handwriting segments to a database of handwriting are taught in U.S. Pat. No. 6,108,444 "Method of grouping handwritten word segments in handwritten document images," which teaches methods of detecting handwritten word segments in handwritten document images, and U.S. Pat. No. 5,953,451 "Method of indexing words in handwritten document images using image hash tables," which teaches methods of indexing words in handwritten document images using image hash tables, both of which are incorporated herein by reference. Otherwise the handwriting can be created with normal pen or pencil and the scribed sheet scanned into the computer.

Figure 9A:
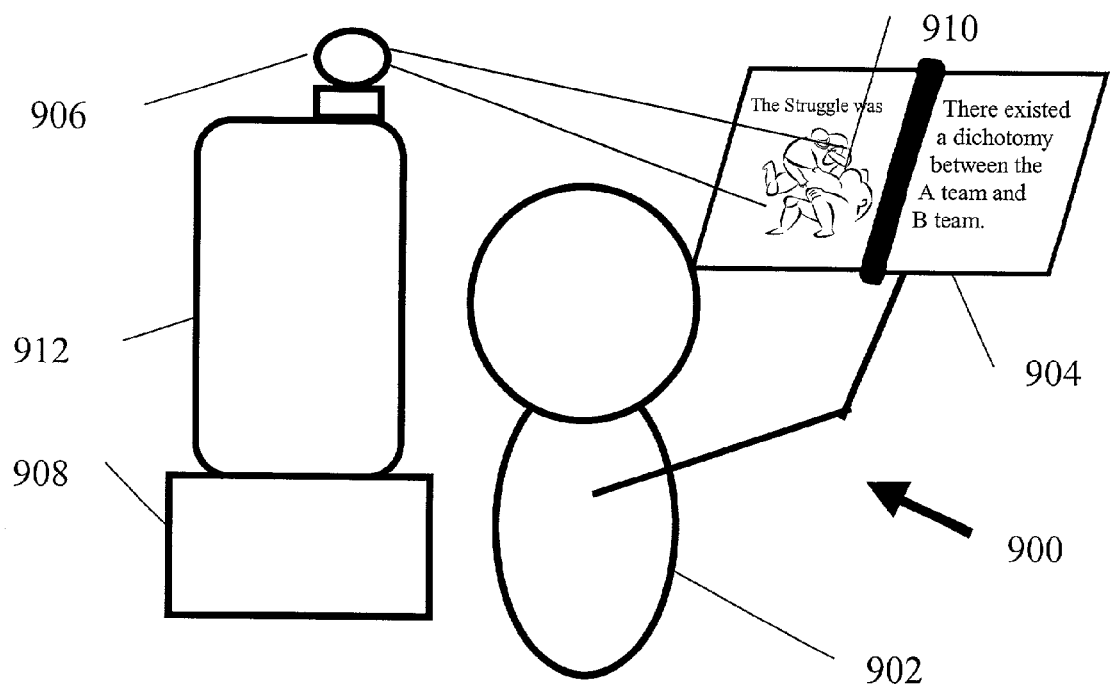
FIG. 9a illustrates a user manipulating off-line media near a stationary probe, consisting of a camera connected to a multimedia computer.
Figure 9B:
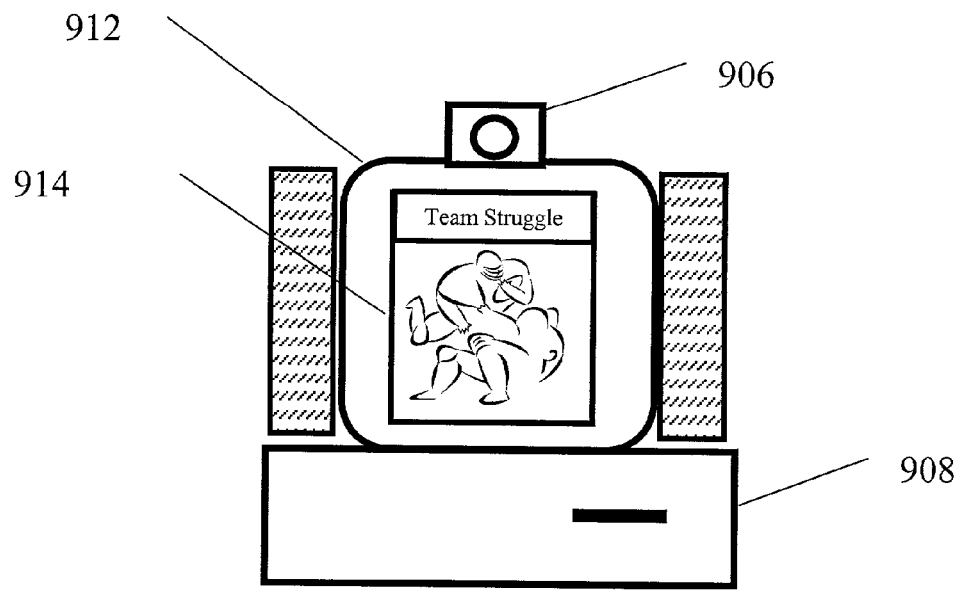
FIG. 9b illustrates a detail of FIG. 9a, showing a frontal view of the computer and camera.

FIG. 9 illustrates an embodiment of the invention 900 enabling a user to manipulate off-line media before a stationary probe. FIG. 9a shows a user 902 holding a magazine 904 (the off-line media) in front of a camera 906 (the probe) mounted on a computer display 912. The camera 906 takes a sample image 910 from the magazine 904 and sends it to the computer 908. The computer 908 matches the sample image 910 to the closest matching reference image. In a preferred embodiment the computer 908 sends a compressed version of the sample image 910 by Internet connection to a remote server (not shown) that performs the matching and presentation method. In this way, the reference image and electronic media databases can be remote and updated to contain the latest images and electronic content, corresponding to the latest issues of magazines supported by a service.

The remote server finds the best reference image match. In response to this match, the remote server sends a video clip 914 (for example MPEG1 compressed video) to the computer for presented on the computer display 912, in response to the sampled image in the magazine 904.

Examples of Simulation Applications

The present invention provides a platform for a large number of educational experiences. Some examples thereof are:
Telescope: the user can explore stars, planets and distant galaxies.
Spectrum Analyzer: the user can view the composition of stars and compounds.
Radio Telescope: the user can hear quasars.
Scale: the user can examine the weight of buildings, people, ants, etc. and explore the gravitational field of the earth and other celestial bodies.
Seismometer: the user can prospect for oil.
Ground Penetrating Radar: the user can search for and discover items such as dinosaur bones.
X-Ray: the user can view the structure of crystals, see into the human body, or a purse when it goes through airport security.
pH meter: the user can measure the pH of items such as food.
Thermometer: the user can determine how hot various portions of the Earth's or other planets' cores are.
Stethoscope: the user can listen to a butterfly's breath or a frog's heartbeat.
Electrophoretic tools: the user can match DNA of different people/characters to see if they are related.
Chemical Assay Devices: the user can find out why someone is sick
Art Instructor: touch a picture in an art book and the computer describes the artist and drawing.
Language Teacher: as student places probe on word in textbook, computer shows word, speaks word, and shows image of object word refers to, translates the word, gives a definition of the word The present invention provides a platform for a large number of commercial services and experiences. Some examples thereof are:
Catalog: view a dress in different colors, see the user in the dress, and order the dress electronic.
Manual: view an object from many perspectives, see an exploded view electronic, provide updates, display different models, present in different languages. Point to a component of a complex piece of machinery to get a part description and part number.
Physical objects: hold up a real object and get a web page related to the object. Give a verbal description of object.
Bill: point to an a disputed item and get the charging client to send a more detailed description electronic
Forms: point to a field and get an electronic verbal or written description of the information required
Photos: point to a photo a company developed for you to order re-prints
Automobiles: point to a picture of a car you would like to buy and see electronic sellers of the car
Blind Assistance Technology: read documents to the blind or poor-sighted. Identify and give a verbal description of object.
Newspaper: point to an ad and order item or cause more electronic information to be presented. The ad does not have to modify as required by Anoto (required dot code) and CueCat technology (requires bar code) since the image database of the newspaper (reference images) can be matched against the newspaper (sampled) image.

Computing Environments

The above system and its described functional elements are implemented in various computing environments. For example, the present invention may be implemented on a conventional IBM PC or equivalent, mobile phone, personal digital assistant (PDA), tablet computer, multi-nodal system (e.g., LAN) or networking system (e.g., Internet, WWW). All programming and data related thereto are stored in computer memory, static or dynamic, and may be retrieved by the user in any of: conventional computer storage (local or remote), display (i.e., CRT) and/or hard copy (i.e., printed) formats.

CONCLUSION

A system and method has been shown for providing a visceral experience to a user by synchronizing a probe's movements on or about off-line media to electronic media output. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing hardware, or specific position determining techniques.

The invention claimed is:

1. A computer-based system for simulating a real tool in which a computer displays data based upon a selected portion of an image printed on an off-line medium, said system comprising:
 a probe device comprising at least a hand-held probe section, said probe device transmitting information of said selected portion to said computer;
 a computer storage medium, said storage medium retaining multimedia data, said multimedia data representative of an output of a real tool examining a selected portion of an actual item corresponding to said selected portion of said image, and
 wherein said computer retrieves said multimedia data synchronized to a position of said selected portion and displays said multimedia data to simulate a real tool.

2. A computer-based system for simulating a real tool in which a computer displays data based upon a selected portion of an image printed on an off-line medium, as per claim 1, wherein said off-line medium includes a plurality of icons printed thereon, each of said icons indicating a different real tool, selection of an icon by said hand-held probe part changing said multimedia data synchronized with a portion of said image so as to be representative of an output of the real tool indicated by said icon.

3. A computer-based systen for simulating a real tool in which a computer display data based upon a selected portion of an image printed on an off-line medium, as per claim 1, wherein a computer display includes a plurality of icons printed thereon, each of said icons indicating a different real tool.

4. A computer-based system for simulating a real tool in which a computer displays data based upon a selected portion of an image printed on an off-line medium, as per claim 1, wherein said real tool is any one of a telescope, spectrum analyzer, radio telescope, magnetometer, scale, seismometer, ground penetrating radar, x-ray, pH device, thermometer, stethoscope, electrophoretic device, Geiger counter, chemical assay device, book reader, word pronouncer, book translator, or dictionary.

5. A computer-based system for simulating a real tool in which a computer displays data based upon a selected portion of an image printed on an off-line medium, as per claim 1, wherein said hand-held probe includes a camera to capture an image of said selected portion and outputs a sampled image.

6. A computer-based system for simulating a real tool in which a computer displays data based upon a selected portion of an image printed on an off-line medium, as per claim 5, further including image retrieval means to match said sampled image to stored reference images.

7. A computer-based system for simulating a real tool in which a computer displays data based upon a selected portion of an image printed on an off-line medium, as per claim 5, further including position determination means to determine relative position of said sampled image to said reference image.

8. A computer-based system for simulating a real tool in which a computer displays data based upon a selected portion of an image printed on an off-line medium, as per claim 1, wherein said hand-held probe section is a bar code reader and said off-line medium ha a plurality of bar codes printed thereon juxtaposed with said image, each of said bar codes designating position data such that said bar code reader reads one of said bar codes, transmits data representative of said bar code, and said computer retrieves and displays data synchronized to said bar code.

9. A computer-based systen for simulating a real tool in which a computer displays data based upon a selected portion of an image printed on an off-line medium, as per claim 8, wherein said bar codes are printed on an overlay superimposed on said off-line media.

10. A computer-based system for simulating a real tool in which a computer displays data based upon a selected portion of an image printed on an off-line medium, as per claim 8, wherein said bar code reader recognizes said bar codes printed with infrared ink.

11. A computer-based systen for simulating a real tool in which a computer displays data based upon a selected portion of an image printed on an off-line medium, as per claim 1, wherein said probe device transmits position information such that said displayed data continuously changes synchronously to said hand-held probe parts movement across said image.

12. A computer-based systen for simulating a real tool in which a computer displays data based upon a selected portion of an image printed on an off-line medium, as per claim 11, wherein said probe device is a digitizer using magnetic fields to determine the hand-held probe position.

13. A computer-based systen for simulating a real tool in which a computer displays data based upon a selected portion of an image printed on an off-line medium, as per claim 11, wherein said probe device is a digitizer using electric fields to determine the hand-held probe position.

14. A computer-based systen for simulating a real tool in which a computer displays data based upon a selected portion of an image printed on an off-line medium, as per claim 11, wherein a user uses a part of his hand as said probe.

15. A computer-based systen for simulating a real tool in which a computer displays data based upon a selected portion of an image printed on an off-line medium, as per claim 11, wherein said probe device is a digitizer using ultrasonic sound to determine the hand-held probe position.

16. A computer-based systen in which electronic media to be presented by a computing device is synchronized to a selected region of off-line medium, said system comprising:
a hand-held imager, said imager detecting a region of said off-line media and transmitting an electronic representation of said region to said computer;
a presentation device, said presentation device presenting electronic media, synchronized to said region of off-line media.

17. A computer-based systen in which electronic media to be presented by a computing device is synchronized to a selected region of off-line medium, as per claim 16, wherein said presentation device is a visual display.

18. A computer-based systen in which electronic media to be presented by a computing device is synchronized to a selected region of off-line medium, as per claim 16, further including a multimedia database storing said electronic media to be presented wherein said electronic media is synchronized to movement of said hand-held imager over said off-line media.

19. A computer-based systen in which electronic media to be presented by a computing device is synchronized to a selected region of off-line medium, as per claim 16, wherein said synchronization simulates the functions of real tools.

20. A computer-based systen in which electronic media to be presented by a computing device is synchronized to a selected region of off-line medium, as per claim 19, wherein said real tool is any one of a telescope, spectrum analyzer, radio telescope, magnetometer, scale, seismometer, ground penetrating radar, x-ray, pH device, thermometer, stethoscope, electrophoretic device, Geiger counter, chemical assay device, book reader, word pronouncer, book translator, or dictionary.

21. A computer-based systen in which electronic media to be presented by a computing device is synchronized to a selected region of off-line medium, as per claim 16, further comprising:
a camera in said hand-held imager, said camera imaging said selected region of off-line media and outputting a sampled image;
a database, containing digital representations of reference images, said reference images including selected regions of off-line media;
an image retriever, receiving said sampled image and identifying said sampled image as a selected region of a reference image in said database,
a position detector receiving said sampled images and outputting position of said sample image in said identified reference image, and wherein said presentation device presents said electronic media based on said position and said identified reference image.

22. A computer-based systen in which electronic media to be presented by a computing device is synchronized to a selected region of off-line medium, as per claim 21, wherein said electronic media is an image.

23. A computer-based systen in which electronic media to be presented by a computing device is synchronized to a selected region of off-line medium, as per claim 21, wherein said electronic media is sound, including any of spoken work, music, or sound effects.

24. A computer-based systen in which electronic media to be presented by a computing device is synchronized to a selected region of off-line medium, as per claim 21 wherein said presented electronic media simulates the function of a real tool selected from the list of a telescope, spectrum analyzer, radio telescope, magnetometer, scale, seismometer, ground penetrating radar, x-ray pH device, thermometer, stethoscope, electrophoretic device, Geiger counter, chemical assay device, book reader, word pronouncer, book translator, or dictionary.

25. A computer-based systen in which electronic media to be displayed by a computer is synchronized to a selected region of an image printed on a off-line medium, as per claim 16, wherein said image is divided into a plurality of regions, each of said regions having a bar code printed therein, and said electronic media representative of an output of a real tool examining a region of an actual item corresponding to said region of said image detected by a hand-held bar code reader used as said hand-held imager.

26. A computer-based systen in which data to be displayed by a computer is synchronized to a selected region of an image printed on a off-line medium, as per claim 25, wherein said off-line medium includes a plurality of icons printed thereon, each of said icons indicating a different real tool, selection of an icon by said hand-held bar code reader changing said electronic media synchronized with each bar code printed in a region of said image so as to be representative of an output of the real tool indicated by said icon.

27. A computer-based systen in which data to be displayed by a computer is synchronized to a selected region of an image printed on a off-line medium, said image divided into a plurality of regions, each of said regions having a bar code printed therein, as per claim 25, wherein said real tool is any one of a telescope, spectrum analyzer, radio telescope, magnetometer, scale, seismometer, ground penetrating radar, x-ray, pH device, thermometer, stethoscope, electrophoretic device, Geiger counter, chemical assay device, book reader, word pronouncer, book translator, or dictionary.

28. A computer-based systen in which data to be displayed by a computer is synchronized to a selected region of an image printed on a off-line medium, said image divided into a plurality of regions, each of said regions having a bar code printed therein, as per claim 25, wherein said image is an image of a structure of a database and navigation of said database is synchronized to movements of said hand-held bar code reader over said image.

29. A method of simulating a real tool in which a computer displays data based upon a selection of a location of an image printed on a off-line medium by a hand-held probe, said off-line medium including a plurality of icons printed thereon, each of said icons indicating a different real tool, said method comprising:

receiving position information representative of a location of said image printed on said off-line medium said hand-held probe part is pointing to;

determining data synchronized to said location;

retrieving said data, said data representative of an output of a real tool examining a location of an actual item corresponding to said location of said image pointed to by said hand-held probe part, and displaying said data.

30. A method of simulating a real tool in which a computer displays data based upon a selection of a location of an image printed on a off-line medium by a hand-held probe, said off-line medium including a plurality of icons printed thereon, each of said icons indicating a different real tool, as per claim 29, said method further comprising:

receiving icon information representative of one of a plurality of icons pointed to by said hand-held probe, said icon representative of a real tool;

changing said data synchronized with said location of said image so as to be representative of an output of the real tool indicated by said icon.

31. A method of simulating a real tool in which a computer displays data based upon a selection of a location of an image printed on a off-line medium by a hand-held probe, said off-line medium including a plurality of icons printed thereon, each of said icons indicating a different real tool, as per claim 29, wherein said real tool is any one of a telescope, spectrum analyzer, radio telescope, magnetometer, scale, seismometer, ground penetrating radar, x-ray, pH device, thermometer, stethoscope, electrophoretic device, Geiger counter, chemical assay device, book reader, word pronouncer, book translator, or dictionary.

* * * * *